US007922210B1

(12) United States Patent
Valenti, Jr. et al.

(10) Patent No.: US 7,922,210 B1
(45) Date of Patent: Apr. 12, 2011

(54) MULTI-LAYER LABEL WITH VARIABLE DATA AND METHOD FOR ITS MANUFACTURE

(75) Inventors: F. Paul Valenti, Jr., Barrington, IL (US); Carl Opel, Carol Stream, IL (US); Dan Hedger, Grayslake, IL (US)

(73) Assignee: Chicago Tag & Label, Inc., Libertyville, IL (US)

( * ) Notice: Subject to any disclaimer, the term of this patent is extended or adjusted under 35 U.S.C. 154(b) by 623 days.

(21) Appl. No.: 11/533,447

(22) Filed: Sep. 20, 2006

Related U.S. Application Data

(60) Provisional application No. 60/718,709, filed on Sep. 20, 2005.

(51) Int. Cl.
*B29C 65/00* (2006.01)
*B32B 37/00* (2006.01)
*B32B 38/14* (2006.01)
*B42D 15/00* (2006.01)

(52) U.S. Cl. .............. 283/94; 156/277; 283/81; 283/98; 283/99; 283/100; 283/101

(58) Field of Classification Search ............... 40/299.01, 40/638; 156/247, 277, 384; 283/61, 62, 283/81, 94, 98, 99, 100, 101, 107, 109, 904; 428/131, 195.1, 204, 211.1, 457, 458, 916; B32B 31/00; B42D 15/10
See application file for complete search history.

(56) References Cited

U.S. PATENT DOCUMENTS

| | | | | |
|---|---|---|---|---|
| 4,951,970 | A | * | 8/1990 | Burt ............................... 283/67 |
| 5,518,329 | A | * | 5/1996 | Beaudry ........................ 400/621 |
| 5,639,125 | A | * | 6/1997 | Garrison ......................... 283/81 |
| 2003/0127180 | A1 | * | 7/2003 | Williams ....................... 156/247 |

OTHER PUBLICATIONS

Color of two-layer label that included variable data on the bottom layer (date of publication unknown but at least as early as Oct. 2005).

* cited by examiner

*Primary Examiner* — Dana Ross
*Assistant Examiner* — Justin V Lewis
(74) *Attorney, Agent, or Firm* — Ice Miller LLP

(57) ABSTRACT

A multi-layer label with variable data and method for its manufacture. First indicia is printed on a first label face ply of a multi-ply label material in registration with an eventual location of at least one of a plurality of multi-layer labels. The first indicia may be variable between at least two of the plurality of multi-layer labels. A second label material is removably adhered to the multi-ply first label material, thereby covering the first indicia. Second indicia is printed on the face of the second label material.

8 Claims, 10 Drawing Sheets

MULTI-LAYER LABEL WITH VARIABLE DATA AND METHOD FOR ITS MANUFACTURE

This application claims priority from U.S. Provisional Patent Application Ser. No. 60/718,709, filed Sep. 20, 2005, the disclosure of which is incorporated herein by reference.

BACKGROUND

Labels are commonly used to secure printed indicia to packages to indicate shipping or other information. In the instance of a shipping use, a customer is often provided with a label that is separate from the package to be shipped. The separate label will be enclosed within a package shipped to the customer containing a purchased item. The separate label is generally preprinted for use if the customer wants to return the item. The customer is generally responsible for properly preparing the label for adhesion to the package by removing a liner. The customer must then properly position it and affix the label. Difficulties during use may arise if the separate label is lost, becomes damaged, or is improperly positioned on the package.

For the foregoing reasons, it is desired to provide a shipping return label that reduces the frequency of times item return labels are lost, damaged, or improperly positioned.

SUMMARY

An aspect of the present disclosure comprises a method for constructing a plurality of multi-layer labels. Such a method comprises the steps of providing a first label material, the first label material comprising a first label face; printing first indicia on the first label face in registration with an eventual location of at least one of a plurality of multi-layer labels, the first indicia being variable between at least two of the plurality of multi-layer labels; removably adhering a second label material to the first label material, the second label material covering the first indicia, the second label material comprising a second label face; and printing second indicia on the second label face in registration with the first indicia on the first label face. According to an aspect of the present disclosure, the first label material may be a multi-ply first label material comprising a liner ply and a first label face ply, wherein the first label face ply comprises the first label face and the first label face ply is removably adhered to the liner ply. According to an aspect of the present disclosure, a method according to the present disclosure may comprise the step of defining boundaries of at least one of the plurality of multi-layer labels, wherein at least one of the plurality of multi-layer labels remains removably adhered to the liner ply. According to an aspect of the present disclosure, a method according to the present disclosure may comprise the step of applying a release coat material to the first label face in registration with an eventual location of at least one of the plurality of multi-layer labels. According to an aspect of the present disclosure, a method according to the present disclosure may comprise the step of defining boundaries of at least one of the plurality of multi-layer labels. According to an aspect of the present disclosure, in a method according to the present disclosure the second label material is removably adhered to the first label material by a repositionable adhesive. According to an aspect of the present disclosure, the steps of printing first indicia on the first label face and printing second indicia on the second label face may be performed concurrently. According to an aspect of the present disclosure, the step of printing first indicia on the first label face and the step of printing second indicia on the second label face may be performed before the step of removably adhering the second label material to the first label material.

An aspect of the present disclosure comprises a system for producing a plurality of multi-layer labels. Such a system comprises a source of a first label material, the first label material comprising a first label face; a first printer that is operable to print first indicia on the first label face in registration with an eventual location of at least one of a plurality of multi-layer labels, where the first indicia is variable between at least two of the plurality of multi-layer labels; a laminator operable to adhere a second label material to the first label material in a manner covering the first indicia, where the second label material comprises a second label face; and a second printer that is operable to print second indicia on the second label face in registration with the first indicia on the first label face. According to an aspect of the present disclosure, a system according to the present disclosure may comprise a release coat applicator operable to apply a release coat material to the first label face in registration with an eventual location of at least one of the plurality of multi-layer labels. According to an aspect of the present disclosure, a system according to the present disclosure may comprise a die cutter that is operable to define boundaries of at least one of the plurality of multi-layer labels. According to an aspect of the present disclosure, the first label material may be a multi-ply first label material, where the multi-ply first label material comprises a liner ply and a first label face ply that is removably adhered to the liner ply, and where a die cutter according to the present disclosure may be operable to define boundaries of the at least one of the plurality of multi-layer labels while retaining at least one of the plurality of multi-layer labels in removable adherence to the liner ply. According to an aspect of the present disclosure, in a system according to the present disclosure the second label material may comprise a repositionable adhesive.

An aspect of the present disclosure comprises a plurality of multi-layer labels. Such multi-layer labels comprise a first label material that comprises a first label face; first indicia printed on the first label face, the first indicia being variable between at least two of the plurality of multi-layer labels; a second label material that comprises a second label face and a repositionable adhesive and that is removably adhered to the first label material by the repositionable adhesive in a manner covering the first indicia; and second indicia printed on the second label face in registration with the first indicia on the first label face. According to an aspect of the present disclosure, the first label material comprises a multi-ply label material comprising a first label face ply removably adhered to a liner ply, wherein boundaries of at least one of a plurality of multi-layer labels are defined in the first label face ply. According to an aspect of the present disclosure, in a multi-layer label according to the present disclosure the first indicia is not defaced when the second label material is removed therefrom.

BRIEF DESCRIPTION OF THE DRAWINGS

The features and advantages of this disclosure, and the manner of attaining them, will be more apparent and better understood by reference to the following descriptions of the disclosed methods and systems, taken in conjunction with the accompanying drawings, wherein.

DESCRIPTION

Figure 1:
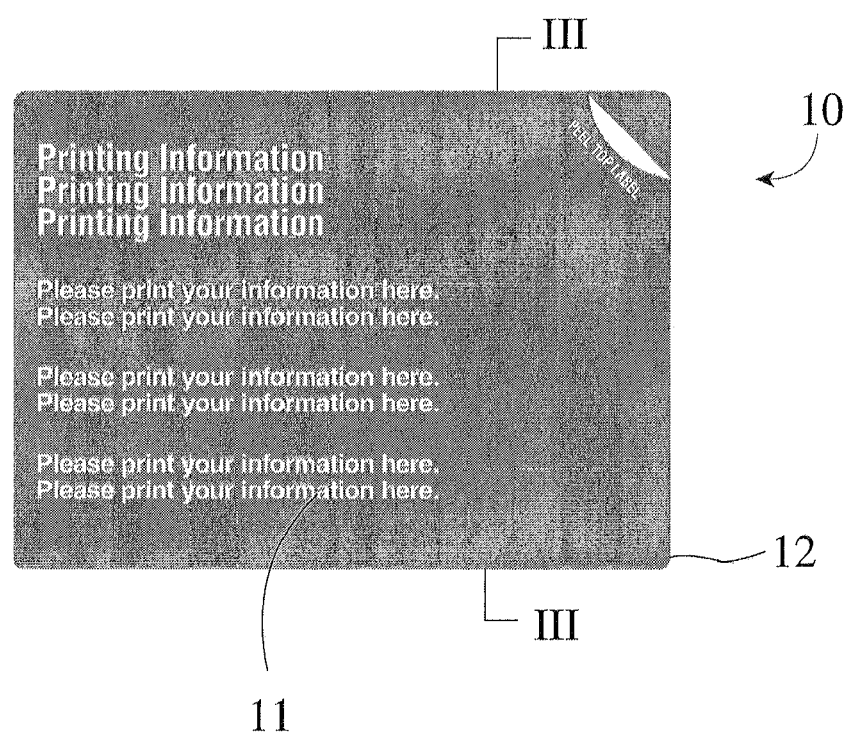
FIG. 1 shows a top view of a multi-part label according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

According to at least one embodiment of the present disclosure, a multi-part label generally includes at least three plies of material including a liner, a middle label material, and a top label material. However, it is within the scope of the present disclosure that a multi-part label may include more than three plies of material.

In at least one embodiment of a multi-part label according to the present disclosure comprising three plies of material, the three plies of material are layered on top of one another in the following sequence from bottom to top: liner, middle label material, and top label material. The liner may be a silicone coated liner. Adhesive is located between the liner and the middle label material. Adhesive also is located between the middle label material and the top label material. The adhesive between the liner and the middle label material may be coextensive with the surface area of the middle label material, but it is not required that the adhesive be coextensive with the surface area of the middle label material. Likewise, the adhesive between the middle label material and the top label material may be co-extensive with the surface area of the top label material, but it is not required that the adhesive be coextensive with the surface area of the top label material.

In at least one embodiment of a multi-part label according to the present disclosure comprising three plies of material, the middle label material and top label material may be substantially the same size. In other embodiments, the middle label material and top label material may be different sizes.

FIG. 1 shows a top view of multi-part label 10 according to at least one embodiment of the present disclosure. Multi-part label 10 of FIG. 1 comprises top ply 12, middle ply 14, and liner 16, although only top ply 12 of multi-part label 10 is visible in FIG. 1. Top ply 12 may comprise indicia 11. Indicia 11 may include printed indicia such as, for example, shipping information, company logos, or directions on how to use multi-part label 10. Indicia 11 may include information useable by a shipping company such as, for example, United Parcel Service, the U.S. Postal Service, or DHL, among others.

According to at least one embodiment of the present disclosure, indicia 11 may be variable, or different, between a two discrete multi-part labels. In another embodiment of the present disclosure indicia 11 may be static, or the same, between a two discrete multi-part labels. Where variable printing is used, it may provide a means, for example, for a unique bar code, unique identifying number, unique shipping address, or unique maxicode for each multi-part label in a series of multi-part labels.

Figure 2:
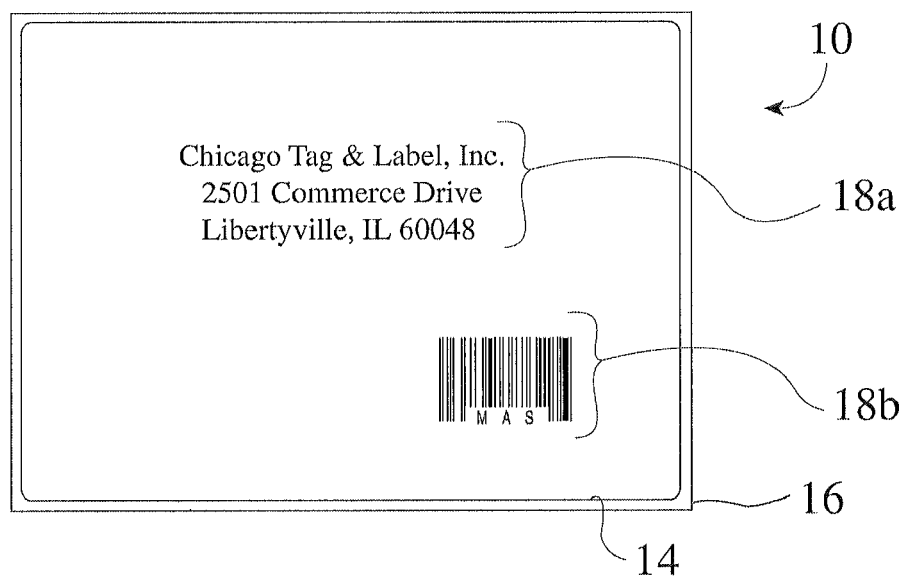
FIG. 2 shows a top view of a multi-part label according to at least one embodiment of the present disclosure, with a top ply removed.

FIG. 2 shows a top view of multi-part label 10 with top ply 12 removed. Visible in FIG. 2 are middle ply 14 and liner 16. Middle ply 14 comprises indicia 18a, 18b printed thereon. Indicia 18a, 18b generally includes printed indicia. The printed indicia on the middle label material may be information such as, for example, return and/or mailing addresses, a tracking number, bar codes, maxicodes, billing account information, or other relevant information. Such indicia may include information useable by a shipping company such as, for example, United Parcel Service, the U.S. Postal Service, or DHL, among others. According to embodiments of the present disclosure, such indicia may be variable or static. Where variable indicia is used, it may provide a means, for example, for a unique bar code, unique identifying number, unique shipping address, or unique maxicode for each multi-part label in a series of multi-part labels.

Figure 3:
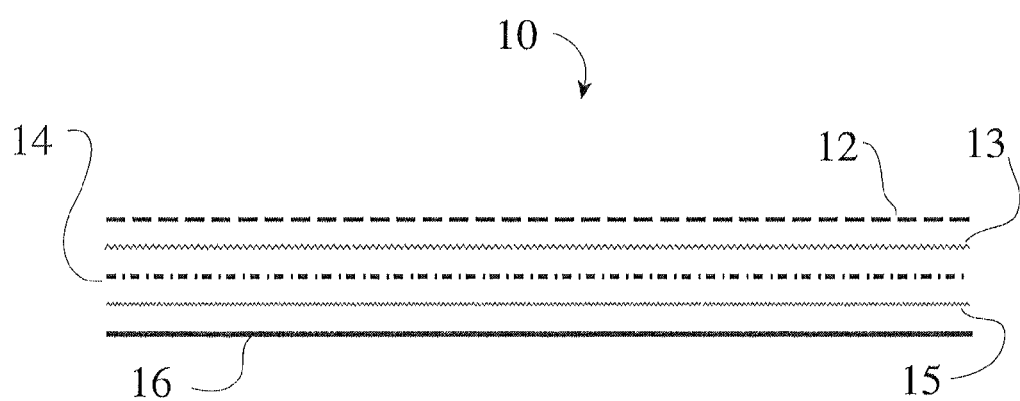
FIG. 3 shows a cross-sectional end view of a multi-part label according to at least one embodiment of the present disclosure.

FIG. 3 shows a cross-sectional end view of multi-part label 10, taken on line III-III of FIG. 1. Shown in FIG. 3 are top ply 12, first adhesive layer 13, middle ply 14, second adhesive layer 15, and liner 16. Top ply 12 is removably adhered to middle ply 14 by first adhesive layer 13. Middle ply 14 is removably adhered to liner 16 by second adhesive layer 15. Liner 16 may be a silicone liner.

The adhesive of first adhesive layer 13 is selected so as to securely adhere top ply 12 to middle ply 14 until it is desired to remove top ply 12 from middle ply 14. The adhesive of first adhesive layer 13 is selected so as to promote removability of top ply 12 when removal of top ply 12 is desired, while mitigating or eliminating the possibility that indicia that may be printed on middle ply 14 will be defaced when top ply 12 is removed therefrom. In at least one embodiment, first adhesive layer 13 comprises a pressure sensitive adhesive. In at least one embodiment, a release coat optionally may be applied to middle ply 14 to promote removabliity of top ply 12. Where used, the release coat is selected so as to be compatible with the adhesive of first adhesive layer 13 in producing the desired removability of top ply 12, while also mitigating or eliminating the possibility that indicia that may be printed on middle ply 14 will be defaced when top ply 12 is removed therefrom. In at least one embodiment, the adhesive of adhesive layer 13 is a repositionable adhesive. Accordingly, top ply 12 may be removed from middle ply 14, and top ply 12 may be re-adhered to one or more other surface(s).

The adhesive of second adhesive layer 15 is selected so as to securely adhere middle ply 14 to liner 16 until it is desired to remove middle ply 14 from liner 16. In at least one embodiment, second adhesive layer 15 comprises a pressure sensitive adhesive. In at least one embodiment, a release coat optionally may be applied to liner 16 to promote removability of middle ply 14. Where used, the release coat is selected so as to be compatible with the adhesive of second adhesive layer 15 in producing the desired removability of middle ply 14. In at least one embodiment, liner 16 may be a silicone coated liner. Middle ply 14 may be removed from liner 16, and then middle ply 14 may be adhered one or more other surface(s).

Figure 4:
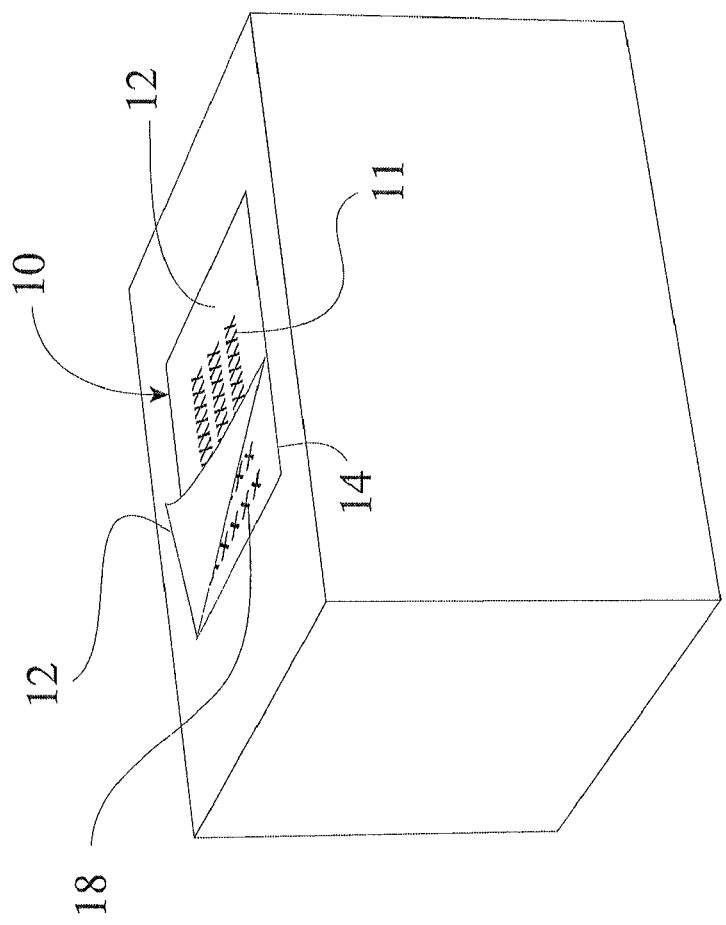
FIG. 4 shows a multi-part label according to at least one embodiment of the present disclosure, as implemented on a package.

FIG. 4 shows at least one embodiment of multi-part label 10 of FIG. 1, as implemented on a package. Indicia 11 is visible on the surface of top ply 12. According to such an embodiment, multi-part label 10 may be affixed to a package by removing liner 16 from the underside of middle ply 14 to reveal second adhesive layer 15. Pressure is applied to top ply 12, thereby adhering the underside of middle ply 14 to the box. In the event it is desired to re-use the box, such as, for example, to return an item to the original sender, the top ply 12 my be removed, thereby revealing indicia 18a, 18b printed on middle ply 14. First adhesive layer 13 adheres to the underside of top ply 12, but not to middle ply 14. The box may be resealed and delivered to an appropriate shipping or mail service.

A multi-part label according to the present disclosure may be used where it is desirable that the customer have an easy means for returning some portion of the purchased merchandise to the merchant or a third party. For example, in mail order clothing sales, the customer may want to return some items to the merchant. Another industry where a multi-part label according to the present disclosure may be useful is for the recycling of used toner cartridges. The customer purchases a package of toner cartridges from a retailer or a mail order merchant. After the toner cartridges are expended, the customer places the used cartridges into the package for transport to a third party that refurbishes and recycles the cartridges. To use the label after receipt of the package, the customer removes the merchandise and saves the package. When it becomes necessary to return the merchandise for whatever reason, the customer peels off the top label material to expose the shipping indicia printed on the middle label material and transfers the package to a shipping company. The shipping company uses the printing on the middle label material to deliver the package and to bill for its service.

Figure 5:
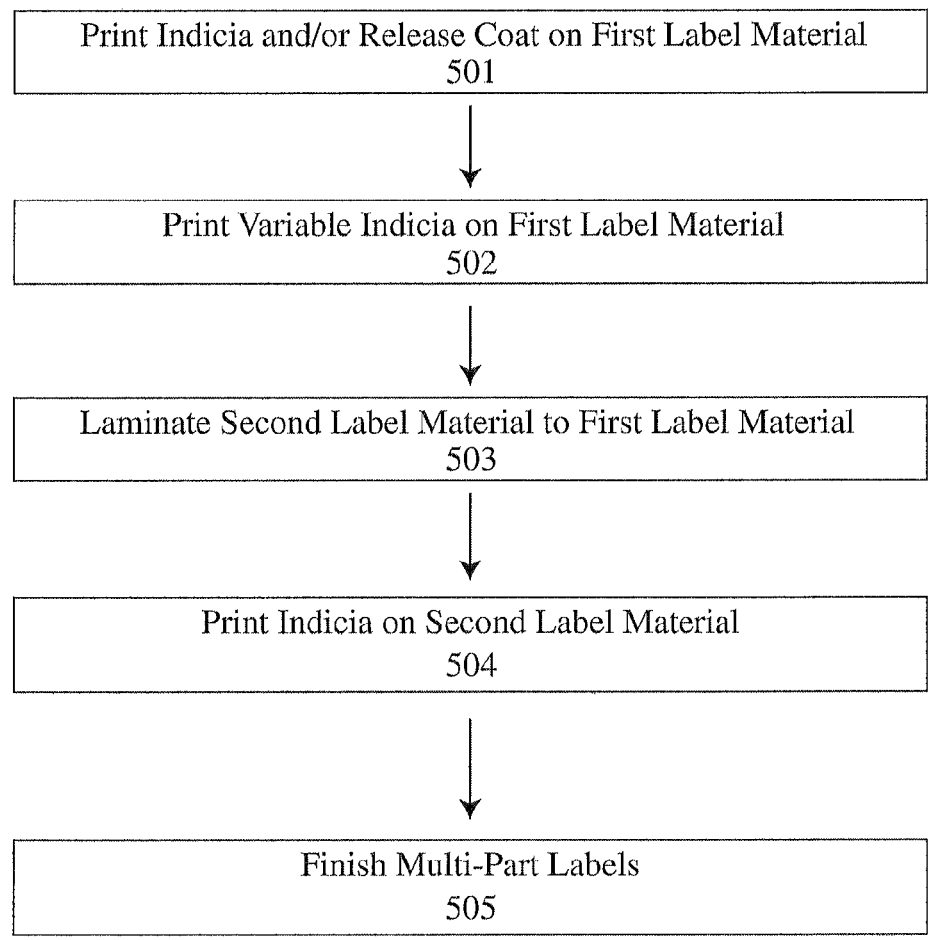
FIG. 5 shows a flowchart illustrating a method according to at least one embodiment of the present disclosure.

In at least one embodiment of the present disclosure, at least one discrete multi-part label, such as, for example, multi-part part label 10, is formed from a continuous roll or web of label material. In at least one embodiment of the present disclosure, such a plurality of discrete multi-part labels include variable indicia. FIG. 5 shows a flowchart illustrating a method according to at least one embodiment of the present disclosure for creating a plurality of discrete multi-part labels from a continuous roll or web of label material, wherein such labels include variable indicia. In step 501 of FIG. 5, indicia is printed on a first label material, which may be a liner-backed label material. Optionally, a release coat may be printed on the first label material in addition to or in lieu of the indicia. In step 502 of FIG. 5, variable indicia is printed on the first label material. In step 503 of FIG. 5, a second label material is removeably laminated to the first label material, with the second label material arranged in relation to the first label material so that the second label material covers the indicia on the first label material. In step 504 of FIG. 5, indicia is printed on the second label material. In step 505 of FIG. 5, the multi-part labels are finished by one or more finishing processes.

Figure 6:
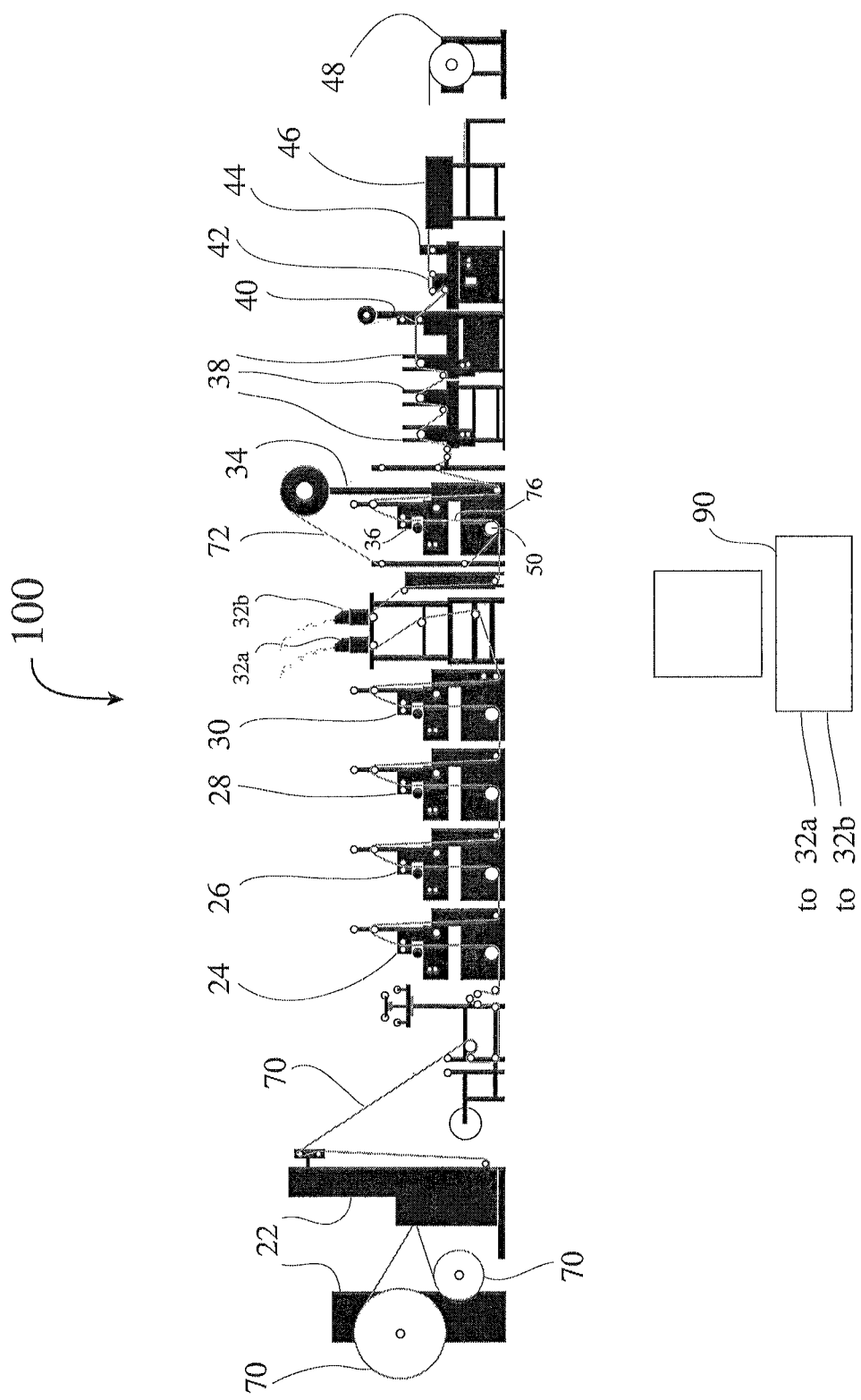
FIG. 6 shows a system according to at least one embodiment of the present disclosure for production of multi-part labels.

FIG. 6 shows a system 100 according to at least one embodiment of the present disclosure for automated production of a plurality of multi-part labels, such as, for example, multi-part label 10. As shown in FIG. 6, at least one roll of first label material 70 is mounted on material source 22. In at least one embodiment of a system according to the present disclosure, first label material 70 comprises a liner component and a label material component, with a pressure-sensitive adhesive interposed between the liner component and the label material component. In such an embodiment, the label material component of first label material 70 may be readily separated from the liner component of first label material 70, with interposed pressure-sensitive adhesive remaining with the label material component of first label material 70 after separation. In at least one embodiment, the liner component of first label material 70 comprises a silicone coating adjacent to the label material component thereof.

In at least one embodiment of a system according to the present disclosure, when a roll of first label material 70 is exhausted, material source 22 is operable to splice the next roll of first label material 70 to the end of the exhausted roll to minimize gaps in production, but a splicing function is not required. Also as shown in FIG. 6, at least one roll of second label material 72 is mounted on or near laminating station 34. In at least one embodiment of a system according to the present disclosure, second label material 72 is an adhesive-backed label stock. In at least one embodiment of a system according to the present disclosure, second label material 72 is an adhesive-backed label stock comprising a repositionable adhesive.

As shown in FIG. 6, in at least one embodiment of system 100 according to the present disclosure first label material 70 is unwound from material source 22 and fed through system 100 at a predetermined rate. One or more of print stations 24, 26, 28, 30 are adapted to print indicia (such as, for example, indicia 18a) on first label material 70 as first label material 70 moves under or through one or more of print stations 24, 26, 28, 30. In at least one embodiment of system 100, one or more of print stations 24, 26, 28, 30 comprise rotary flexographic print stations. In other embodiments, one or more of print stations 24, 26, 28, 30 comprise rotary letterpress printers, offset printers, and/or digital printers. After being presented with the disclosure herein, one of ordinary skill in the relevant art will realize that other types of printers may be used to create indicia on first label material 70 without departing from the spirit and scope of the present disclosure.

In at least one embodiment of system 100, each of print stations 24, 26, 28, 30 is adapted to print a single color ink on first label material 70 according to a predetermined printing pattern as first label material 70 moves under or through one or more of print stations 24, 26, 28, 30. The inks used in print stations 24, 26, 28, 30 are selected to be compatible with print stations 24, 26, 28, 30, first label material 70, and the intended use of the plurality of multi-part labels to be formed from first label material 70. Such inks may include water-based flexographic inks and UV curable inks. After being presented with the disclosure herein, one of ordinary skill in the relevant art will realize that other types of materials may be used to create indicia on first label material 70 without departing from the spirit and scope of the present disclosure.

In at least one embodiment of system 100 according to the present disclosure, one or more of print stations 24, 26, 28, 30 are adapted to print static indicia on first label material 70 as first label material 70 moves under or through one or more of print stations 24, 26, 28, 30, i.e., one or more of print stations 24, 26, 28, 30 each is adapted to print the same indicia in the same pattern on each discrete multi-part label that is to be formed from the continuous roll or web of first label material 70. In at least one embodiment of system 100, the actions of one or more of print stations 24, 26, 28, 30 may be controlled by a computer (not shown in FIG. 6). For example, a computer may control the timing of print stations 24, 26, 28, 30, and/or the alignment and registration of first label material 70 and print stations 24, 26, 28, 30, and/or other functions of print stations 24, 26, 28, 30.

In at least one embodiment of system 100, one or more of print stations 24, 26, 28, 30 optionally may be adapted to apply a release coat material to first label material 70 as first label material 70 moves under or through such print station(s). Where used, the release coat material is selected so as to be compatible with the adhesive backing of second label material 72 in promoting the desired removability of second label material 72. Where used, the release coat material is selected so as mitigate or eliminate the possibility that indicia that may be printed on first label material 70 will be defaced when second label material 72 is removed therefrom. Such a release coat may be applied in a predetermined release coat application pattern, such as a predetermined release coat application pattern that less than fully covers the label material component of first label material 70. Alternatively, such a release coat may be applied so that the release coat fully covers the label material component of first label material 70. In at least one embodiment of system 100 according to the present disclosure, one or more of print stations 24, 26, 28, 30 may be adapted to apply the same release coat in the same pattern on each discrete multi-part label that is to be formed from the continuous roll or web of first label material 70. The application of a release coat by one or more of print stations 24, 26, 28, 30 may be controlled by a computer (not shown in FIG. 6).

In the embodiment of system 100 shown in FIG. 6, following print stations 24, 26, 28, 30, first label material 70 is fed through variable printers 32a, 32b. Variable printers 32a, 32b are adapted to print indicia (such as, for example, indicia 18b) on first label material 70. In at least one embodiment of system 100, variable printers 32a, 32b may be ink jet printers. In at least one embodiment of system 100, variable printers 32a, 32b may be laser printers. The inks, toners, or other printing materials used in variable printers 32a, 32b are selected to be compatible with variable printers 32a, 32b, first label material 70, and the intended use of the plurality of multi-part labels to be formed from first label material 70. After being presented with the disclosure herein, one of ordinary skill in the relevant art will realize that other types of printers and other materials may be used to create indicia on first label material 70 without departing from the spirit and scope of the present disclosure.

In at least one embodiment of system 100 according to the present disclosure, variable printers 32a, 32b are adapted to print variable indicia on first label material 70, i.e., variable printers 32a, 32b are adapted to print different indicia on at least two of the discrete multi-part labels that are to be formed from the continuous roll or web of first label material 70. In at least one embodiment of system 100 according to the present disclosure, variable printers 32a, 32b are adapted to print different indicia on each discrete multi-part label that is to be formed from the continuous roll or web of first label material 70. For example, variable printers 32a, 32b may be adapted to print a different address on different discrete multi-part labels, or may be adapted to print a different bar code on different discrete multi-part labels, or may be adapted to print a different maxicode on different discrete multi-part labels, or may be adapted to print different billing account information on different discrete multi-part labels, or may be adapted to print a different tracking number on different discrete multi-part labels. After being presented with the disclosure herein, one of ordinary skill in the relevant art will realize that other types of variable indicia may be printed without departing from the spirit and scope of the present disclosure.

In at least one embodiment of system 100 according to the present disclosure, the actions of variable printers 32a, 32b are controlled by computer 90. Although only one computer 90 is shown in FIG. 6, it should be understood that system 100 can include multiple computers 90. Computer 90 can include a personal computer, a computer terminal, a personal digital assistant (PDA) and/or other types of devices as may occur to one of ordinary skill in the relevant art after being presented with the disclosure herein. In one embodiment, computer 90 is a personal computer. In at least one embodiment, a datafile of variable indicia is stored on computer 90, which computer is electronically interconnected with variable printers 32a, 32b. Such electronic interconnection may be accomplished by hardwiring, radio frequency communication, or such other forms of electronic interconnection as may occur to one of ordinary skill in the relevant art after being presented with the disclosure herein. As first label material 70 passes under or through variable printers 32a, 32b, computer 90 transmits data from the datafile to variable printers 32a, 32b, which data is output by variable printers 32a, 32b as variable indicia on first label material 70. In at least one embodiment of the present disclosure, variable printers 32a, 32b comprise computers, software, and printer systems provided by Scitex, Kodak, or other such providers.

In the embodiment of system 100 shown in FIG. 6, following variable printers 32a, 32b, first label material 70 passes through idler 50. Second label material 72 is unwound from material source 34 and also is fed through idler 50 where second label material 72 is laminated on top of first label material 70 to form multi-layered label stock 76. The underside of second label material 72 comprises an adhesive such that after laminating second label material 72 on top of first label material 70, second label material 72 may later be removed completely from first label material 70 without damaging first label material 70 or the indicia that may be on first label material 70. Optionally, a release coating may be applied to first label material 70 at one or more of print stations 24, 26, 28, 30 to facilitate removability of second label material 72.

In the embodiment of system 100 shown in FIG. 6, following idler 50, multi-layered label stock 76 is fed through print station 36 where indicia (such as, for example, indicia 11) is printed on a surface of multi-layered label stock 76, i.e., on a surface of second label material 72. In at least one embodiment of system 100, print station 36 comprise a rotary flexographic print station. In other embodiments, print station 36 comprises a rotary letterpress printers, an offset printer, or a digital printer. In at least one embodiment of system 100, print station 36 is adapted to print a single color on multi-layered label stock 76 according to a predetermined printing pattern as multi-layered label stock 76 moves under or through print station 36. The ink used in print station 36 is selected to be compatible with print station 36, second label material 72, and the intended use of the plurality of multi-part labels to be formed from second label material 72. Such inks may include water-based flexographic inks and UV curable inks. After being presented with the disclosure herein, one of ordinary skill in the relevant art will realize that other types of printers and other materials may be used to create indicia on second label material 72 without departing from the spirit and scope of the present disclosure.

In at least one embodiment of system 100 according to the present disclosure, print station 36 adapted to print static indicia on multi-layered label stock 76 as multi-layered label stock 76 moves under or through print station 36, i.e., print station 36 is adapted to print the same indicia in the same pattern on each discrete multi-part label that is to be formed from the continuous roll or web of multi-layered label stock 76. In at least one embodiment of system 100, the actions of print station 36 may be controlled by a computer (not shown in FIG. 6). For example, a computer may control the timing of print station 36, and/or the alignment and registration of multi-layered label stock 76 and print station 36, and/or other functions of print station 36.

In at least one embodiment of system for automated production of a plurality of multi-part labels according to the present disclosure, multi-layered label stock including all indicia printed thereon may be finished by one or more optional finishing operations. For example, in the embodiment of system 100 shown in FIG. 6, following print station 36 multi-layered label stock 76 is fed through a first die station 38. In at least one embodiment of system 100, at first die station 38 an undercut die cuts through both the liner component and the label material component of first label material 70, but not through the second label material 72, thereby creating a corner peel tab for one or more of the discrete multi-part labels that are to be formed from the continuous roll or web of multi-layered label stock 76. In at least one embodiment of system 100, at first die station 38, an undercut die cuts only through the liner component of first label material 70, and not through the label material component of first label material 70 or through second label material 72, thereby creating a corner peel tab for one or more of the discrete multi-part labels that are to be formed from the continuous roll or web of multi-layered label stock 76.

In another example of a finishing operation, in the embodiment of system 100 shown in FIG. 6, following first die station 38, multi-layered label stock 76 is fed through a second die station 38, where a die cuts through second label material 72 and the label material component of first label material 70, but not through the liner component of first label material 70, thereby defining the boundaries of discrete multi-part labels that remain affixed to the liner component of first label material 70. It should be noted that it also is possible to die cut the boundaries of discrete multi-part labels before die cutting the corner peel tabs.

An additional die station 38 is shown in the embodiment of system 100 of FIG. 6. Such additional die station 38 optionally may be adapted for specialty die cutting and punching operations. Other embodiments of system 100 may adapted to include one or more additional optional die stations to meet the die cutting and punching needs of a particular multi-part label design.

In the embodiment of system 100 shown in FIG. 6, following die stations 38, multi-layered label stock 76 is fed through an optional waste removal station 40. Waste removal station 40 is operable to remove all or substantially all of the portions of second label material 72 and the label material component of first label material 70 that are outside the boundaries of discrete multi-part labels affixed to the liner component of first label material 70, while leaving the discrete multi-part labels affixed to the liner component of first label material 70.

In the embodiment of system 100 shown in FIG. 6, following waste removal station 40, multi-layered label stock 76 is fed through an optional slitter station 42. Slitter station 42 may be used where multi-layered label stock 76 is configured so that a plurality of streams of discrete multi-layered labels are arranged across the width of multi-layered label stock 76. Multi-layered label stock 76, including the discrete multi-part labels affixed thereto, may be slit into individual streams of discrete multi-layered labels at slitter station 42.

In the embodiment of system 100 shown in FIG. 6, following slitter station 42, multi-layered label stock 76 may be finished by cutting perforations between discrete multi-part labels at optional sheeter station 44, which labels are then fan folded at the perforations into flat packs by optional fan folder 46. Optionally, in at least one embodiment of a system for automated production of multi-part labels according to the present disclosure, multi-layered label stock 76 may finished by shearing, at sheeter 44, multi-layered label stock 76 into discrete sheets including the discrete multi-part labels affixed thereto.

Also shown in FIG. 6 is optional rewinder 48. In at least one embodiment of a system according to the present disclosure for automated production of multi-part labels, multi-layered label stock 76 may finished by winding multi-layered label stock 76, including the discrete multi-part labels affixed thereto, on a roll by a rewinder 48. Where used, rewinder 48 is used in lieu of sheeter station 44 and fan folder 46, according to at least one embodiment of the present disclosure.

Figure 7:
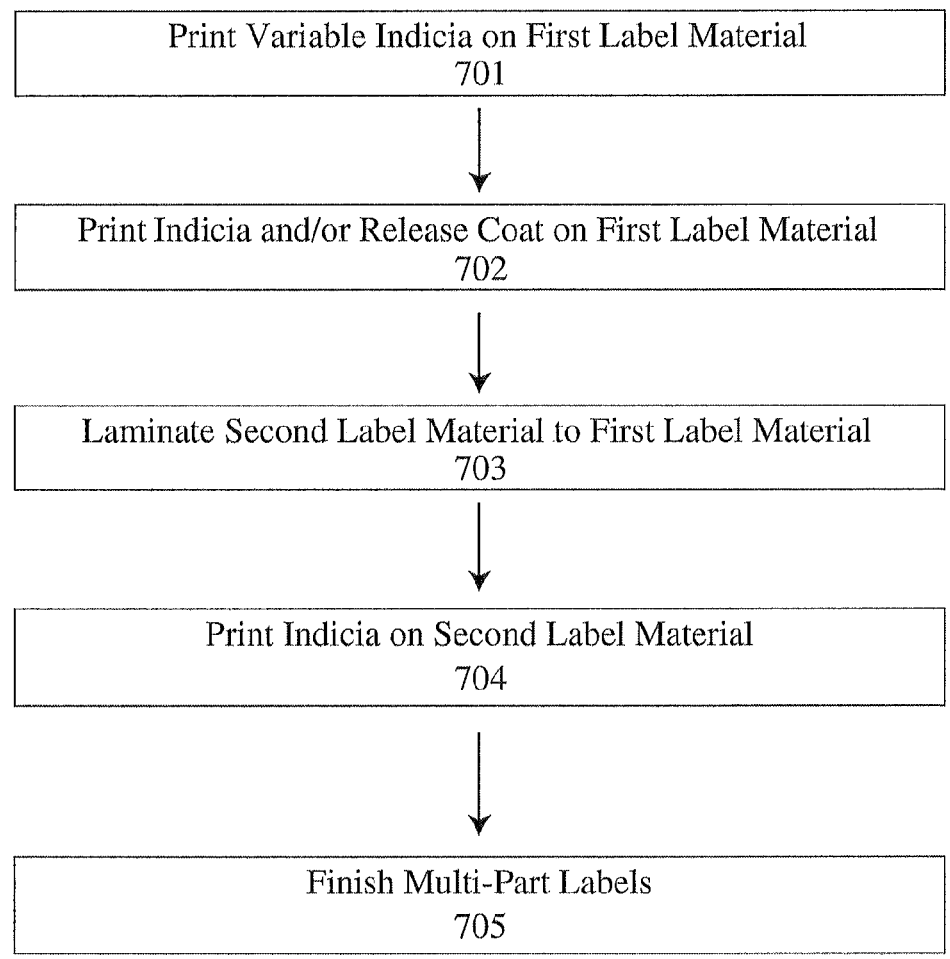
FIG. 7 shows a flowchart illustrating a method according to at least one embodiment of the present disclosure.

FIG. 7 shows a flowchart illustrating a method according to at least one embodiment of the present disclosure for creating a plurality of discrete multi-part labels (such as, for example, multi-part part label 10) from a continuous roll or web of label material, wherein such labels include variable indicia. In step 701 of FIG. 7, variable indicia is printed on a first label material, which may be a liner-backed label material. In step 702 of FIG. 7, other indicia may be printed on the first label material. Optionally, a release coat may be printed on the first label material in addition to or in lieu of such other indicia. In step 703 of FIG. 7, a second label material is removeably laminated to the first label material, with the second label material arranged in relation to the first label material so that the second label material covers the indicia on the first label material. In step 704 of FIG. 7, indicia is printed on the second label material. In step 705 of FIG. 7, the multi-part labels are finished by one or more finishing processes.

Figure 8:
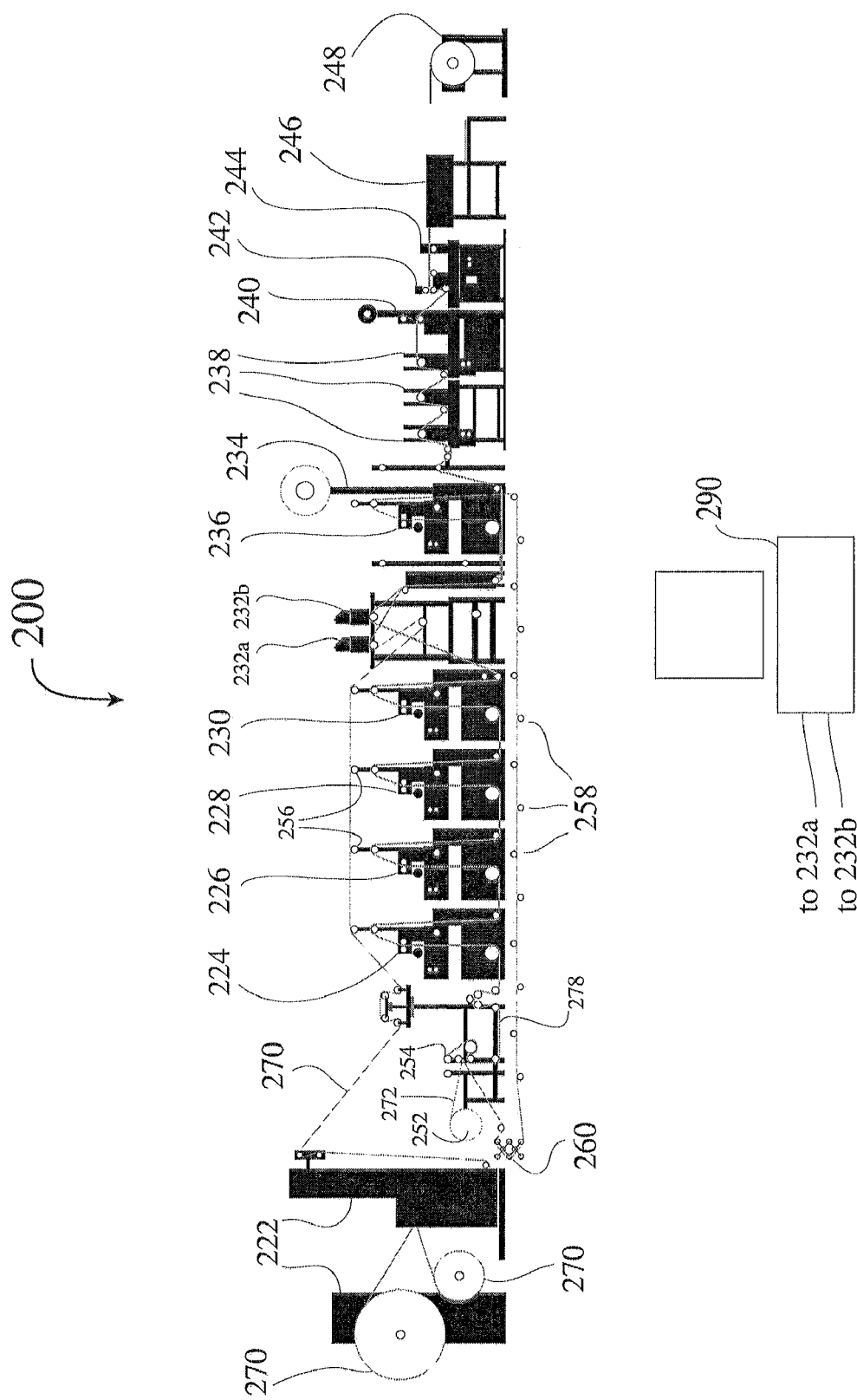
FIG. 8 shows a system according to at least one embodiment of the present disclosure for production of multi-part labels.

FIG. 8 shows system 200 according to at least one embodiment of the present disclosure for automated production of a plurality of multi-part labels, such as, for example, multi-part label 10. As shown in FIG. 8, at least one roll of first label material 270 is mounted on first material source 222. In at least one embodiment of a system according to the present disclosure, first label material 270 comprises a liner component and a label material component, with a pressure-sensitive adhesive interposed between the liner component and the label material component. In such an embodiment, the label material component of first label material 270 may be readily separated from the liner component of first label material 270, with interposed pressure-sensitive adhesive remaining with the label material component of first label material 270 after separation. In at least one embodiment, liner component of first label material 270 comprises a silicone coating adjacent to the label material component thereof.

In at least one embodiment of a system according to the present disclosure, when a roll of first label material 270 is exhausted, first material source 222 is operable to splice the next roll of first label material 270 to the end of the exhausted roll to minimize gaps in production, but a splicing function is not required. Also as shown in FIG. 8, at least one roll of second label material 272 is mounted is mounted on second material source 252. In at least one embodiment of a system according to the present disclosure, second label material 272 is an adhesive-backed label stock. In at least one embodiment of a system according to the present disclosure, second label material 272 is an adhesive-backed label stock comprising a repositionable adhesive.

As shown in FIG. 8, in at least one embodiment of system 200 according to the present disclosure first label material 270 is unwound from first material source 222 and fed through system 200 at a predetermined rate. First label material 270 is routed along guides 256 and then is fed under or through variable printers 232a, 232b. Guides 256 may be rollers. Variable printers 232a, 232b are adapted to print indicia (such as, for example, indicia 18b) on first label material 270. In at least one embodiment of system 200, variable printers 232a, 232b may be ink jet printers. In at least one embodiment of system 200, variable printers 232a, 232b may be laser printers. The inks, toners, or other printing materials used in variable printers 232a, 232b are selected to be compatible with variable printers 232a, 232b, first label material 270, and the intended use of the plurality of multi-part labels to be formed from first label material 270. After being presented with the disclosure herein, one of ordinary skill in the relevant art will realize that other types of printers and other materials may be used to create indicia on first label material 270 without departing from the spirit and scope of the present disclosure.

In at least one embodiment of system 200 according to the present disclosure, variable printers 232a, 232b are adapted to print variable indicia on first label material 270, i.e., variable printers 232a, 232b are adapted to print different indicia on at least two of the discrete multi-part labels that are to be formed from the continuous roll or web of first label material 270. In at least one embodiment of system 200 according to the present disclosure, variable printers 232a, 232b are adapted to print different indicia on each discrete multi-part label that is to be formed from the continuous roll or web of first label material 270. For example, variable printers 232a, 232b may be adapted to print a different address on different discrete multi-part labels, or may be adapted to print a different bar code on different discrete multi-part labels, or may be adapted to print a different maxicode on different discrete multi-part labels, or may be adapted to print different billing account information on different discrete multi-part labels, or may be adapted to print a different tracking number on different discrete multi-part labels. After being presented with the disclosure herein, one of ordinary skill in the relevant art will realize that other types of variable indicia may be printed without departing from the spirit and scope of the present disclosure.

In at least one embodiment of system 200 according to the present disclosure, the actions of variable printers 232a, 232b are controlled by computer 290. Although only one computer 290 is shown in FIG. 8, it should be understood that system 200 can include multiple computers 290. Computer 290 can include a personal computer, a computer terminal, a personal digital assistant (PDA) and/or other types of devices as may occur to one of ordinary skill in the relevant art after being presented with the disclosure herein. In one embodiment, computer 290 is a personal computer. In at least one embodiment, a datafile of variable indicia is stored on computer 290, which computer is electronically interconnected with variable printers 232a, 232b. Such electronic interconnection may be accomplished by hardwiring, radio frequency communication, or such other forms of electronic interconnection as may occur to one of ordinary skill in the relevant art after being presented with the disclosure herein. As first label material 270 passes under or through variable printers 232a, 232b, computer 290 transmits data from the datafile to variable printers 232a, 232b, which data is output by variable printers 232a, 232b as variable indicia on first label material 270. In at least one embodiment of the present disclosure, variable printers 232a, 232b comprise computers, software, and printer systems provided by Scitex, Kodak, or other such providers.

In the embodiment of system 200 shown in FIG. 8, following variable printers 232a, 232b, first label material 270 is fed through print station 236, where other indicia (such as, for example, indicia 18a) may be printed on first label material 270. In at least one embodiment of system 200, print station 236 comprise a rotary flexographic print station. In other embodiments, print station 236 comprises a rotary letterpress printers, an offset printer, or a digital printer. In at least one embodiment of system 200, print station 236 is adapted to print a single color on first label material 270 as first label material 270 moves under or through print station 236 according to a predetermined printing pattern. The inks used in print station 236 are selected to be compatible with print station 236, first label material 270, and the intended use of the plurality of multi-part labels to be formed from first label material 270. Such inks may include water-based flexographic inks and UV curable inks. After being presented with the disclosure herein, one of ordinary skill in the relevant art will realize that other types of printers and other materials may be used to create indicia on first label material 270 without departing from the spirit and scope of the present disclosure.

In at least one embodiment of system 200 according to the present disclosure, print station 236 is adapted to print static indicia on multi-layered label stock 278 as multi-layered label stock 278 moves under or through print station 236, i.e., print station 236 is adapted to print the same indicia in the same pattern on each discrete multi-part label that is to be formed from the continuous roll or web of multi-layered label stock 278. In at least one embodiment of system 200, the actions of print station 236 may be controlled by a computer (not shown in FIG. 8). For example, a computer may control the timing of print station 236, and/or the alignment and registration of multi-layered label stock 278 and print station 236, and/or other functions of print station 236.

In at least one embodiment of system 200 according to the present disclosure, print station 236 optionally may be adapted to apply a release coat material to first label material 270 as first label material 270 moves under or through print station 236. Where used, the release coat material is selected so as to be compatible with the adhesive backing of second label material 272 in promoting the desired removability of second label material 272. Where used, the release coat material is selected so as mitigate or eliminate the possibility that indicia that may be printed on first label material 270 will be defaced when second label material 272 is removed therefrom. Such a release coat may be applied in a predetermined release coat application pattern, such as a predetermined release coat application pattern that less than fully covers the label material component of first label material 270. Alternatively, such a release coat may be applied so that the release coat fully covers the label material component of first label material 270. In at least one embodiment of system 200 according to the present disclosure, print station 236 may be adapted to apply the same release coat in the same pattern on each discrete multi-part label that is to be formed from the continuous roll or web of first label material 270. The application of a release coat by print station 236 may be controlled by a computer (not shown in FIG. 8).

In the embodiment of system 200 shown in FIG. 8, following print station 236, first label material 270 is routed along and through guides 258, 260, and then through idler 254. Guides 258, 260 may be rollers. Second label material 272 is unwound from second material source 252 and also is fed through idler 254 where second label material 272 is laminated on top of first label material 270 to form multi-layered label stock 278. The underside of second label material 272 comprises an adhesive such that after laminating second label material 272 on top of first label material 270, second label material 272 may later be removed completely from first label material 270 without damaging first label material 270 or the indicia that may be on first label material 270. Optionally, a release coating may be applied to first label material 270 at print station 236 to facilitate proper removeability of second label material 272.

In the embodiment of system 200 shown in FIG. 8, following idler 254, multi-layered label stock 278 is routed under or through one or more of print stations 224, 226, 228, 230, exposing second label material 272 to one or more of print stations 224, 226, 228, 230. One or more of print stations 224, 226, 228, 230 are adapted to print indicia (such as, for example, indicia 11) on second label material 272 as multi-layered label stock 278 moves under or through one or more of print stations 224, 226, 228, 230. In at least one embodiment of system 200, one or more of print stations 224, 226, 228, 230 comprise rotary flexographic print stations. In other embodiments, one or more of print stations 224, 226, 228, 230 comprise rotary letterpress printers, offset printers, and/or digital printers.

In at least one embodiment of system 200, each of print stations 224, 226, 228, 230 is adapted to print a single color ink on second label material 272 according to a predetermined printing pattern as multi-layered label stock 278 moves under or through one or more of print stations 224, 226, 228, 230. The inks used in print stations 224, 226, 228, 230 are selected to be compatible with print stations 224, 226, 228, 230, second label material 272, and the intended use of the plurality of multi-part labels to be formed from second label material 272. Such inks may include water-based flexographic inks and UV curable inks. After being presented with the disclosure herein, one of ordinary skill in the relevant art will realize that other types of printers and other materials may be used to create indicia on second label material 272 without departing from the spirit and scope of the present disclosure.

In at least one embodiment of system 200 according to the present disclosure, one or more of print stations 224, 226, 228, 230 are adapted to print static indicia on second label material 272 as multi-layered label stock 278 moves under or through one or more of print stations 224, 226, 228, 230, i.e., one or more of print stations 224, 226, 228, 230 are adapted to print the same indicia in the same pattern on each discrete multi-part label that is to be formed from the continuous roll or web of multi-layered label stock 278. In at least one embodiment of system 200, the actions of one or more of print stations 224, 226, 228, 230 may be controlled by a computer (not shown in FIG. 8). For example, a computer may control the timing of print stations 224, 226, 228, 230, and/or the alignment and registration of first label material 278 and print stations 224, 226, 228, 230, and/or other functions of print stations 224, 226, 228, 230.

In at least one embodiment of system for automated production of a plurality of multi-part labels according to the present disclosure, multi-layered label stock including all indicia printed thereon may be finished by one or more optional finishing operations. For example, in the embodiment of system 200 shown in FIG. 8, following print stations 224, 226, 228, 230, multi-layered label stock 278, including all indicia printed thereon, is fed through a first die station 238. In at least one embodiment of system 200, at first die station 238, an undercut die cuts through both the liner component and the label material component of first label material 270, but not through the second label material 272, thereby creating a corner peel tab for one or more of the discrete multi-part labels that are to be formed from the continuous roll or web of multi-layered label stock 278. In at least one embodiment of system 200, at first die station 238, an undercut die cuts through both the liner component of first label material 270, but not through the label material component of first label material 270 or through second label material 272, thereby creating a corner peel tab for one or more of the discrete multi-part labels that are to be formed from the continuous roll or web of multi-layered label stock 278.

In another example of a finishing operation, in the embodiment of system 200 shown in FIG. 8, following first die station 238, multi-layered label stock 278 is fed through a second die station 238, where a die cuts through second label material 272 and the label material component of first label material 270, but not through the liner component of first label material 270, thereby defining the boundaries of discrete multi-part labels that remain affixed to the liner component of first label material 270. It should be noted that it also is possible to die cut the boundaries of discrete multi-part labels before die cutting the corner peel tabs.

An additional die station 238 is shown in the embodiment of system 200 of FIG. 8. Such additional die station 238 optionally may be adapted for specialty die cutting and punching operations. Other embodiments of system 200 may adapted to include one or more additional optional die stations to meet the die cutting and punching needs of a particular multi-part label design.

In the embodiment of system 200 shown in FIG. 8, following die stations 238, multi-layered label stock 278 is fed through an optional waste removal station 240. Waste removal station 240 is operable to remove all or substantially all of the portions of second label material 272 and the label material component of first label material 270 that are outside the boundaries of discrete multi-part labels affixed to the liner component of first label material 270, while leaving the discrete multi-part labels affixed to the liner component of first label material 270.

In the embodiment of system 200 shown in FIG. 8, following waste removal station 240, multi-layered label stock 278 is fed through an optional slitter station 242. Slitter station 242 may be used where multi-layered label stock 278 is configured so that a plurality of streams of discrete multi-layered labels are arranged across the width of multi-layered label stock 278. Multi-layered label stock 278, including the discrete multi-part labels affixed thereto, may be slit into individual streams of discrete multi-layered labels at slitter station 242.

In the embodiment of system 200 shown in FIG. 8, following slitter station 242, multi-layered label stock 278 may be finished by cutting perforations between discrete multi-part labels at optional sheeter station 244, which labels are then fan folded at the perforations into flat packs by optional fan folder 246. Optionally, in at least one embodiment of a system for automated production of multi-part labels according to the present disclosure, multi-layered label stock 278 may finished by shearing, at sheeter 244, multi-layered label stock 278 into discrete sheets including the discrete multi-part labels affixed thereto.

Also shown in FIG. 8 is optional rewinder 248. In at least one embodiment of a system according to the present disclosure for automated production of multi-part labels, multi-layered label stock 278 may finished by winding multi-layered label stock 278, including the discrete multi-part labels affixed thereto, on a roll by a rewinder 248. Where used, rewinder 248 is used in lieu of sheeter station 244 and fan folder 246, according to at least one embodiment of the present disclosure.

Figure 9:
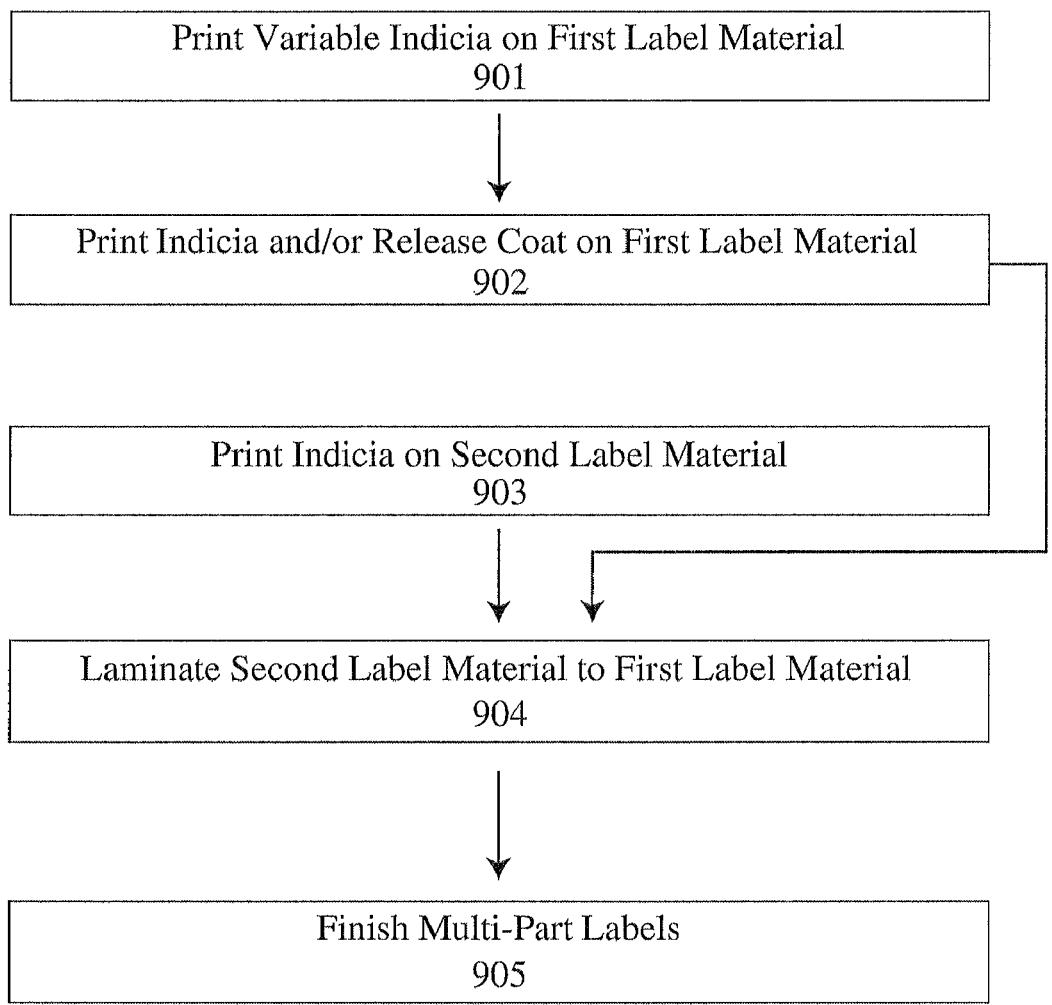
FIG. 9 shows a flowchart illustrating a method according to at least one embodiment of the present disclosure.

FIG. 9 shows a flowchart illustrating a method according to at least one embodiment of the present disclosure for creating a plurality of discrete multi-part labels (such as, for example, multi-part part label 10) from a continuous roll or web of label material, wherein such labels include variable indicia. In step 901 of FIG. 9, variable indicia is printed on a first label material, which may be a liner-backed label material. In step 902 of FIG. 9, other indicia may be printed on the first label material. Optionally, a release coat may be printed on the first label material in addition to or in lieu of such other indicia. In step 903 of FIG. 9, indicia is printed on the second label material. Step 903 may be performed concurrently with step 901 and/or step 902. In step 904 of FIG. 9, a second label material is removably laminated to the first label material, with the second label material arranged in relation to the first label material so that the second label material covers the indicia on the first label material. In step 905 of FIG. 9, the multi-part labels are finished by one or more finishing processes.

Figure 10A:
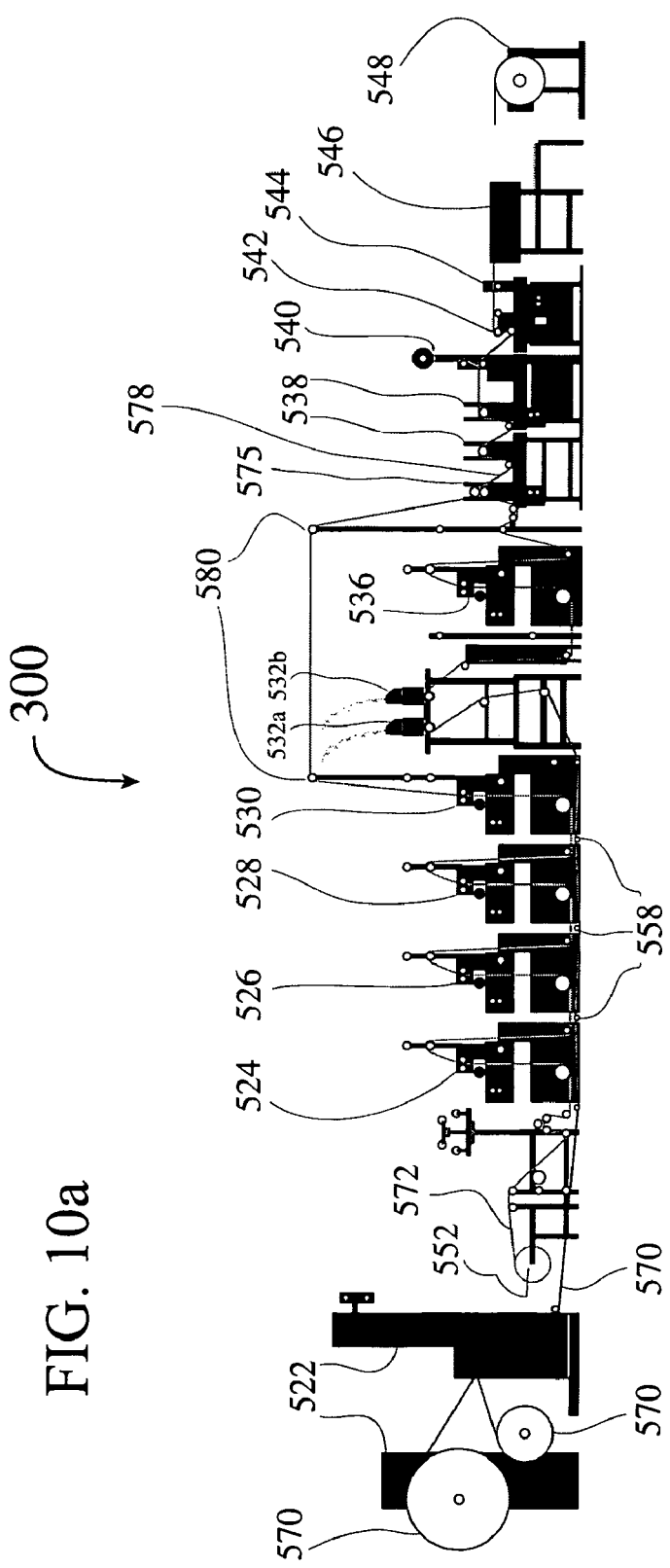
FIG. 10a shows a system according to at least one embodiment of the present disclosure for production of multi-part labels.

FIG. 10*a* shows system 300 according to at least one embodiment of the present disclosure for automated production of a plurality of multi-part labels, such as, for example, multi-part label 10. As shown in FIG. 10*a*, at least one roll of first label material 570 is mounted on first material source 522. In at least one embodiment of a system according to the present disclosure, first label material 570 comprises a liner component and a label material component, with a pressure-sensitive adhesive interposed between the liner component and the label material component. In such an embodiment, the label material component of first label material 570 may be readily separated from the liner component of first label material 570, with interposed pressure-sensitive adhesive remaining with the label material component of first label material 570 after separation. In at least one embodiment, liner component of first label material 570 comprises a silicone coating adjacent to the label material component thereof.

In at least one embodiment of a system according to the present disclosure, when a roll of first label material 570 is exhausted, first material source 522 is operable to splice the next roll of first label material 570 to the end of the exhausted roll to minimize gaps in production, but a splicing function is not required. Also as shown in FIG. 10*a*, at least one roll of second label material 572 is mounted on second material source 552. In at least one embodiment of a system according to the present disclosure, second label material 572 is an adhesive-backed label stock. In at least one embodiment of a system according to the present disclosure, second label material 572 is an adhesive-backed label stock comprising a repositionable adhesive.

As shown in FIG. 10*a*, in at least one embodiment of system 300 according to the present disclosure first label material 570 is unwound from first material source 522 and fed through system 300 at a predetermined rate. First label material 570 is routed along guides 556 and then is fed under or through variable printers 532*a*, 532*b*. Guides 556 may be rollers. Variable printers 532*a*, 532*b* are adapted to print indicia (such as, for example, indicia 18*b*) on first label material 570. In at least one embodiment of system 300, variable printers 532*a*, 532*b* may be ink jet printers. In at least one embodiment of system 300, variable printers 532*a*, 532*b* may be laser printers. The inks, toners, or other printing materials used in variable printers 532*a*, 532*b* are selected to be compatible with variable printers 532*a*, 532*b*, first label material 570, and the intended use of the plurality of multi-part labels to be formed from first label material 570. After being presented with the disclosure herein, one of ordinary skill in the relevant art will realize that other types of printers and other materials may be used to create indicia on first label material 570 without departing from the spirit and scope of the present disclosure.

In at least one embodiment of system 300 according to the present disclosure, variable printers 532*a*, 532*b* are adapted to print variable indicia on first label material 570, i.e., variable printers 532*a*, 532*b* are adapted to print different indicia on at least two of the discrete multi-part labels that are to be formed from the continuous roll or web of first label material 570. In at least one embodiment of system 300 according to the present disclosure, variable printers 532*a*, 532*b* are adapted to print different indicia on each discrete multi-part label that is to be formed from the continuous roll or web of first label material 570. For example, variable printers 532*a*, 532*b* may be adapted to print a different address on different discrete multi-part labels, or may be adapted to print a different bar code on different discrete multi-part labels, or may be adapted to print a different maxicode on different discrete multi-part labels, or may be adapted to print different billing account information on different discrete multi-part labels, or may be adapted to print a different tracking number on different discrete multi-part labels. After being presented with the disclosure herein, one of ordinary skill in the relevant art will realize that other types of variable indicia may be printed without departing from the spirit and scope of the present disclosure.

Figure 10B:
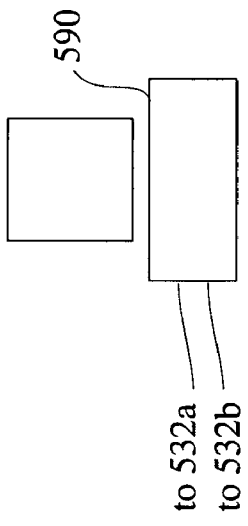
FIG. 10b shows a computer according to at least one embodiment of the present disclosure for production of multi-part labels.

In at least one embodiment of system 500 according to the present disclosure, the actions of variable printers 532*a*, 532*b* are controlled by computer 590 (shown in FIG. 10*b*). Although only one computer 590 is shown in FIG. 10*b*, it should be understood that system 500 can include multiple computers 590. Computer 590 can include a personal computer, a computer terminal, a personal digital assistant (PDA) and/or other types of devices as may occur to one of ordinary skill in the relevant art after being presented with the disclosure herein. In one embodiment, computer 590 is a personal computer. In at least one embodiment, a datafile of variable indicia is stored on computer 590, which computer is electronically interconnected with variable printers 532*a*, 532*b*. Such electronic interconnection may be accomplished by hardwiring, radio frequency communication, or such other forms of electronic interconnection as may occur to one of ordinary skill in the relevant art after being presented with the disclosure herein. As first label material 570 passes under or through variable printers 532*a*, 532*b*, computer 590 transmits data from the datafile to variable printers 532*a*, 532*b*, which data is output by variable printers 532*a*, 532*b* as variable indicia on first label material 570. In at least one embodiment of the present disclosure, variable printers 532*a*, 532*b* comprise computers, software, and printer systems provided by Scitex, Kodak, or other such providers.

In the embodiment of system 300 shown in FIG. 10*a*, following variable printers 532*a*, 532*b*, first label material 570 is fed through print station 536, where other indicia (such as, for example, indicia 18*a*) may be printed on first label material 570. In at least one embodiment of system 300, print station 536 comprise a rotary flexographic print station. In other embodiments, print station 536 comprises a rotary letterpress printers, an offset printer, or a digital printer. In at least one embodiment of system 300, print station 536 is adapted to print a single color on first label material 570 as first label material 570 moves under or through print station 536 according to a predetermined printing pattern. The inks used in print station 536 are selected to be compatible with print station 536, first label material 570, and the intended use of the plurality of multi-part labels to be formed from first label material 570. Such inks may include water-based flexographic inks and UV curable inks. After being presented with the disclosure herein, one of ordinary skill in the relevant art will realize that other types of printers and other materials may be used to create indicia on first label material 570 without departing from the spirit and scope of the present disclosure.

In at least one embodiment of system 300 according to the present disclosure, print station 536 is adapted to print static indicia on multi-layered label stock 578 as multi-layered label stock 578 moves under or through print station 536, i.e., print station 536 is adapted to print the same indicia in the same pattern on each discrete multi-part label that is to be formed from the continuous roll or web of multi-layered label stock 578. In at least one embodiment of system 300, the actions of print station 536 may be controlled by a computer (not shown in FIG. 10*a*). For example, a computer may control the timing of print station 536, and/or the alignment and registration of multi-layered label stock 578 and print station 536, and/or other functions of print station 536.

In at least one embodiment of system 300 according to the present disclosure, print station 536 optionally may be adapted to apply a release coat material to first label material 570 as first label material 570 moves under or through print station 536. Where used, the release coat material is selected so as to be compatible with the adhesive backing of second label material 572 in promoting the desired removability of second label material 572. Where used, the release coat material is selected so as mitigate or eliminate the possibility that indicia that may be printed on first label material 570 will be defaced when second label material 572 is removed therefrom. Such a release coat may be applied in a predetermined release coat application pattern, such as a predetermined release coat application pattern that less than fully covers the label material component of first label material 570. Alternatively, such a release coat may be applied so that the release coat fully covers the label material component of first label material 570. In at least one embodiment of system 300 according to the present disclosure, print station 536 may be adapted to apply the same release coat in the same pattern on each discrete multi-part label that is to be formed from the continuous roll or web of first label material 570. The application of a release coat by print station 536 may be controlled by a computer (not shown in FIG. 10*a*).

In the embodiment of system 300 shown in FIG. 10*a*, second label material 572 is unwound from second material source 552. Second label material 572 is routed under or through one or more of print stations 524, 526, 528, 530, exposing second label material 572 to one or more of print stations 524, 526, 528, 530. One or more of print stations 524, 526, 528, 530 are adapted to print indicia (such as, for example, indicia 11) on second label material 572 as second label material 572 moves under or through one or more of print stations 524, 526, 528, 530. In at least one embodiment of system 300, one or more of print stations 524, 526, 528, 530 comprise rotary flexographic print stations. In other embodiments, one or more of print stations 524, 526, 528, 530 comprise rotary letterpress printers, offset printers, and/or digital printers.

In at least one embodiment of system 300, each of print stations 524, 526, 528, 530 is adapted to print a single color ink on second label material 572 according to a predetermined printing pattern as second label material 572 moves under or through one or more of print stations 524, 526, 528, 530. The inks used in print stations 524, 526, 528, 530 are selected to be compatible with print stations 524, 526, 528, 530, second label material 572, and the intended use of the plurality of multi-part labels to be formed from second label material 572. Such inks may include water-based flexographic inks and UV curable inks. After being presented with the disclosure herein, one of ordinary skill in the relevant art will realize that other types of printers and other materials may be used to create indicia on second label material 572 without departing from the spirit and scope of the present disclosure.

In at least one embodiment of system 300 according to the present disclosure, one or more of print stations 524, 526, 528, 530 are adapted to print static indicia on second label material 572 as second label material 572 moves under or through one or more of print stations 524, 526, 528, 530, i.e., one or more of print stations 524, 526, 528, 530 are adapted to print the same indicia in the same pattern on each discrete multi-part label that is to be formed from the continuous roll or web of second label material 572. In at least one embodiment of system 300, the actions of one or more of print stations 524, 526, 528, 530 may be controlled by a computer (not shown in FIG. 10*a*). For example, a computer may control the timing of print stations 524, 526, 528, 530, and/or the alignment and registration of first label material 578 and print stations 524, 526, 528, 530, and/or other functions of print stations 524, 526, 528, 530.

In the embodiment of system 300 shown in FIG. 10*a*, following print stations 524, 526, 528, 530, second label material 572 is routed by guides 580 to nip roller 575. In the embodiment of system 300 shown in FIG. 10*a*, following printer station 536, first label material 570 is fed to nip roller 575. At nip roller 575, second label material 572 is laminated on top of first label material 570 to form multi-layered label stock 578. The underside of second label material 572 comprises an adhesive such that after laminating second label material 572 on top of first label material 570, second label material 572 may later be removed completely from first label material 570 without damaging first label material 570 or the indicia that may be on first label material 570. Optionally, a release coating may be applied to first label material 570 at print station 536 to facilitate proper removability of second label material 572.

In at least one embodiment of system for automated production of a plurality of multi-part labels according to the present disclosure, multi-layered label stock including all indicia printed thereon may be finished by one or more optional finishing operations. For example, in the embodiment of system 300 shown in FIG. 10*a*, following nip roller 575, multi-layered label stock 578, including all indicia printed thereon, is fed through a first die station 538. In at least one embodiment of system 300, at first die station 538, an undercut die cuts through both the liner component and the label material component of first label material 570, but not through the second label material 572, thereby creating a corner peel tab for one or more of the discrete multi-part labels that are to be formed from the continuous roll or web of multi-layered label stock 578. In at least one embodiment of system 300, at first die station 538, an undercut die cuts through both the liner component of first label material 570, but not through the label material component of first label material 570 or through second label material 572, thereby creating a corner peel tab for one or more of the discrete multi-part labels that are to be formed from the continuous roll or web of multi-layered label stock 578.

In another example of a finishing operation, in the embodiment of system 300 shown in FIG. 10*a*, following first die station 538, multi-layered label stock 578 is fed through a second die station 538, where a die cuts through second label material 572 and the label material component of first label material 570, but not through the liner component of first label material 570, thereby defining the boundaries of discrete multi-part labels that remain affixed to the liner component of first label material 570. It should be noted that it also is possible to die cut the boundaries of discrete multi-part labels before die cutting the corner peel tabs. Other embodiments of system 300 may adapted to include one or more additional optional die stations to meet the die cutting and punching needs of a particular multi-part label design.

In the embodiment of system 300 shown in FIG. 10*a*, following die stations 538, multi-layered label stock 578 is fed through an optional waste removal station 540. Waste removal station 540 is operable to remove all or substantially all of the portions of second label material 572 and the label material component of first label material 570 that are outside the boundaries of discrete multi-part labels affixed to the liner component of first label material 570, while leaving the discrete multi-part labels affixed to the liner component of first label material 570.

In the embodiment of system 300 shown in FIG. 10*a*, following waste removal station 540, multi-layered label stock 578 is fed through an optional slitter station 542. Slitter station 542 may be used where multi-layered label stock 578 is configured so that a plurality of streams of discrete multi-layered labels are arranged across the width of multi-layered label stock 578. Multi-layered label stock 578, including the discrete multi-part labels affixed thereto, may be slit into individual streams of discrete multi-layered labels at slitter station 542.

In the embodiment of system 300 shown in FIG. 10*a*, following slitter station 542, multi-layered label stock 578 may be finished by cutting perforations between discrete multi-part labels at optional sheeter station 544, which labels are then fan folded at the perforations into flat packs by optional fan folder 546. Optionally, in at least one embodiment of a system for automated production of multi-part labels according to the present disclosure, multi-layered label stock 578 may finished by shearing, at sheeter 544, multi-layered label stock 578 into discrete sheets including the discrete multi-part labels affixed thereto.

Also shown in FIG. 10*a* is optional rewinder 548. In at least one embodiment of a system according to the present disclosure for automated production of multi-part labels, multi-layered label stock 578 may finished by winding multi-layered label stock 578, including the discrete multi-part labels affixed thereto, on a roll by a rewinder 548. Where used, rewinder 548 is used in lieu of sheeter station 544 and fan folder 546, according to at least one embodiment of the present disclosure.

System 100 of FIG. 6, system 200 of FIG. 8, and system 300 of FIG. 10*a* merely represent exemplary embodiments of systems according to the present disclosure for automated production of multi-part labels. For example, although two variable printers are shown in such embodiments, the present disclosure is not limited to systems comprising two variable printers. Other embodiments of systems according to the present disclosure may comprise more than or less than two variable printers. Also, for example, in systems according to the present disclosure for automated production of multi-part labels, the one or more print stations, variable one or more print stations, and laminating processes may be arranged so that zero colors, one color, or a plurality of colors may be printed on the repositionable label stock and/or on the liner-backed label stock. Similarly, the one or more print stations, variable one or more print stations, and laminating process may be arranged so that a release coat may be applied to all, a portion, or none of the liner-backed label stock. Similarly, the one or more print stations, variable one or more print stations, and laminating process may be arranged so that variable indicia may be printed on the repositionable label stock and/or on the liner-backed label stock. After being presented with the disclosure herein, one of ordinary skill in the relevant art will realize that other configurations systems for automated production of multi-part labels are possible, and each such system is within the scope of the present disclosure.

Also, for example, in systems according to the present disclosure for automated production of multi-part labels, the print stations, variable print stations, and laminating processes may be arranged so that zero colors, one color, or a plurality of colors may be printed on one or more layers of the multi-part labels. Similarly, the print stations, variable print stations, and laminating process may be arranged so that a release coat may be applied to all, a portion, or none of one or more layers of the multi-part labels. Similarly, the print stations, variable print stations, and laminating process may be arranged so that variable indicia may be printed on one or more layers of the multi-part labels. After being presented with the disclosure herein, one of ordinary skill in the relevant art will realize that other configurations systems for automated production of multi-part labels are possible, and each such system is within the scope of the present disclosure.

Also, for example, many embodiments of systems, methods, and labels disclosed herein discuss a plurality of multi-part labels comprising at least one liner-backed layer. Multi-part labels that do not comprise at least one liner-backed layer, and systems and methods related to the same, are within the scope of the present disclosure. For example, in lieu of a liner-backed layer, a multi-part label according to at least one embodiment of the present disclosure may comprise a layer backed with a dry gum adhesive. Such an embodiment of a multi-part label is within the scope of the present disclosure.

While this disclosure has been described as having a preferred design, the systems and methods according to the present disclosure can be further modified within the scope and spirit of this disclosure. This application is therefore intended to cover any variations, uses, or adaptations of the disclosure using its general principles. For example, the methods disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains and which fall within the limits of the appended claims.

What is claimed is:

1. A method for constructing a plurality of multi-layer labels, the method comprising the steps of:
   providing a first label material, said first label material comprising a first label face;
   printing first indicia on said first label face in registration with an eventual location of at least one of a plurality of multi-layer labels, said first indicia being variable between at least two of said plurality of multi-layer labels;
   removably adhering a second label material to said first label material, said second label material covering said first indicia, said second label material comprising a second label face; and
   printing second indicia on said second label face in registration with said first indicia on said first label face, wherein the step of printing first indicia on said first label face and the step of printing second indicia on said second label face are performed before the step of removably adhering said second label material to said first label material.

2. The method of claim 1, wherein said first label material is a multi-ply first label material, said multi-ply first label material comprising a liner ply and a first label face ply, said first label face ply comprising said first label face, said first label face ply being removably adhered to said liner ply.

3. The method of claim 2, further comprising the step of:
defining boundaries of said at least one of said plurality of multi-layer labels, wherein said at least one of said plurality of multi-layer labels remains removably adhered to said liner ply.

4. The method of claim 1, further comprising the step of:
applying a release coat material to said first label face in registration with an eventual location of at least one of said plurality of multi-layer labels.

5. The method of claim 1, further comprising the step of:
defining boundaries of said at least one of said plurality of multi-layer labels.

6. The method of claim 5, wherein said second label material further comprises a bottom face opposing said second label face, and wherein said second label material is removably adhered to said first label material by a repositionable adhesive, said repositionable adhesive substantially covering said bottom face within said boundaries and wherein all of said second label material within said boundaries is removable from said first label material and adherable elsewhere.

7. The method of claim 1, wherein said second label material is removably adhered to said first label material by a repositionable adhesive.

8. A method for constructing a plurality of multi-layer labels, the method comprising the steps of:
providing a first label material, said first label material comprising a first label face;
printing first indicia on said first label face in registration with an eventual location of at least one of a plurality of multi-layer labels, said first indicia being variable between at least two of said plurality of multi-layer labels;
removably adhering a second label material to said first label material, said second label material covering said first indicia, said second label material comprising a second label face; and
printing second indicia on said second label face in registration with said first indicia on said first label face,
wherein the steps of printing first indicia on said first label face and printing second indicia on said second label face are performed concurrently.

* * * * *